United States Patent
Lee

(10) Patent No.: US 10,505,402 B2
(45) Date of Patent: Dec. 10, 2019

(54) STRUCTURE OF WIRELESS POWER TRANSMISSION SYSTEM

(71) Applicant: LG ELECTRONICS INC., Seoul (KR)

(72) Inventor: Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/735,454

(22) PCT Filed: Feb. 18, 2016

(86) PCT No.: PCT/KR2016/001652
§ 371 (c)(1),
(2) Date: Dec. 11, 2017

(87) PCT Pub. No.: WO2016/200011
PCT Pub. Date: Dec. 15, 2016

(65) Prior Publication Data
US 2018/0219422 A1 Aug. 2, 2018

Related U.S. Application Data
(60) Provisional application No. 62/174,278, filed on Jun. 11, 2015.

(51) Int. Cl.
| | |
|---|---|
| *H02J 50/12* | (2016.01) |
| *H01F 38/14* | (2006.01) |
| *H01F 27/28* | (2006.01) |
| *H02J 50/80* | (2016.01) |
| *H02J 50/70* | (2016.01) |

(Continued)

(52) U.S. Cl.
CPC ............ *H02J 50/12* (2016.02); *H01F 27/006* (2013.01); *H01F 27/255* (2013.01); *H01F 27/2823* (2013.01); *H01F 27/2871* (2013.01); *H01F 38/14* (2013.01); *H02J 50/70* (2016.02); *H02J 50/80* (2016.02); *H01F 1/34* (2013.01); *H01F 27/306* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,283,858 | B2 * | 3/2016 | Boys | B60L 11/182 |
| 9,441,603 | B2 * | 9/2016 | Khan | B60L 53/36 |

(Continued)

FOREIGN PATENT DOCUMENTS

| | | |
|---|---|---|
| JP | 2014-135382 A | 7/2014 |
| KR | 10-2011-0006528 A | 1/2011 |
| KR | 10-2015-0005479 A | 1/2015 |

*Primary Examiner* — An T Luu
(74) *Attorney, Agent, or Firm* — Birch, Stewart, Kolasch & Birch, LLP

(57) ABSTRACT

An embodiment of the present invention relates to a coil assembly for a wireless power transmitter, comprising: a single coil, which comprises a wire, and which has a circular hole formed therein; and a plurality of shielding members (ferrites) coupled to the single coil, wherein the outer diameter of the single coil may be approximately equal to or larger than about 185 mm and equal to or less than 195 mm, and the inner diameter of the single coil may be approximately equal to or larger than 75 mm and equal to or less than 85 mm.

14 Claims, 13 Drawing Sheets

(51) Int. Cl.
*H01F 27/00* (2006.01)
*H01F 27/255* (2006.01)
*H01F 1/34* (2006.01)
*H01F 27/30* (2006.01)

(56) References Cited

U.S. PATENT DOCUMENTS

| | | | |
|---|---|---|---|
| 9,859,718 B2 * | 1/2018 | Kagami | H01F 27/36 |
| 10,177,592 B2 * | 1/2019 | Park | H02J 7/02 |
| 2014/0070766 A1 | 3/2014 | Tabata et al. | |
| 2015/0054350 A1 | 2/2015 | Covic et al. | |
| 2018/0025838 A1 * | 1/2018 | Som | H05B 6/062 |
| | | | 361/143 |

* cited by examiner

[Fig. 1]
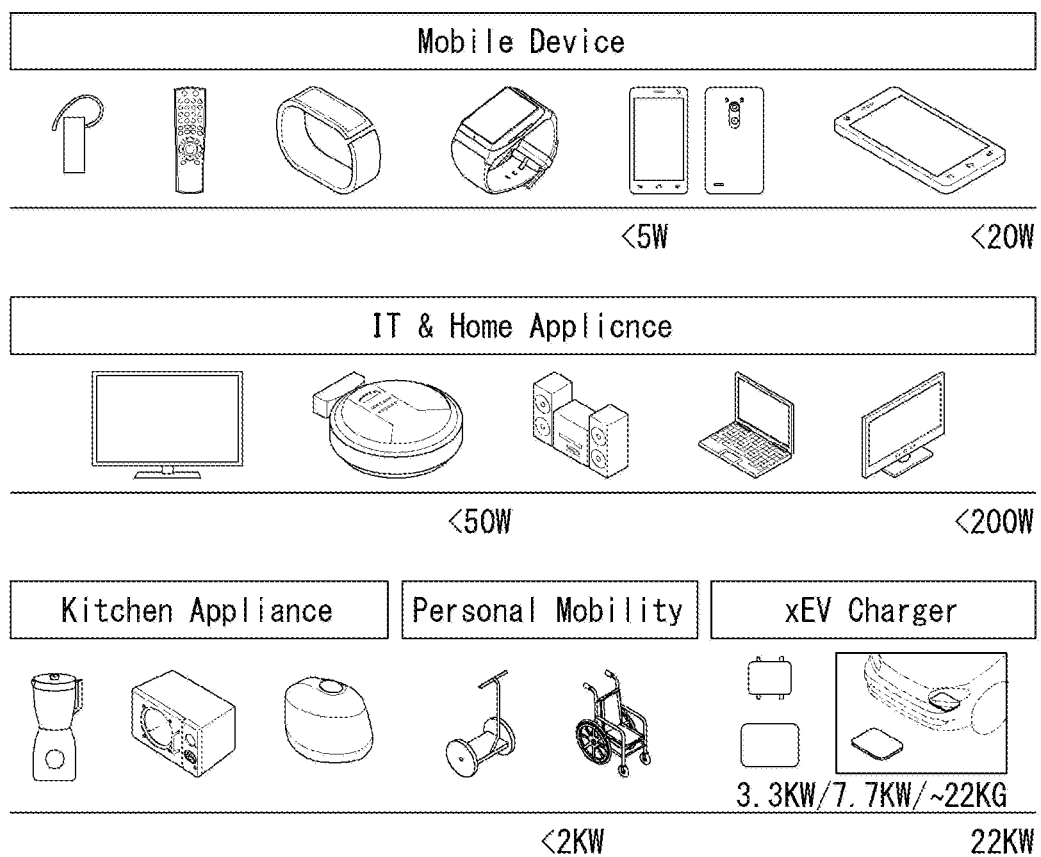

[Fig. 2]
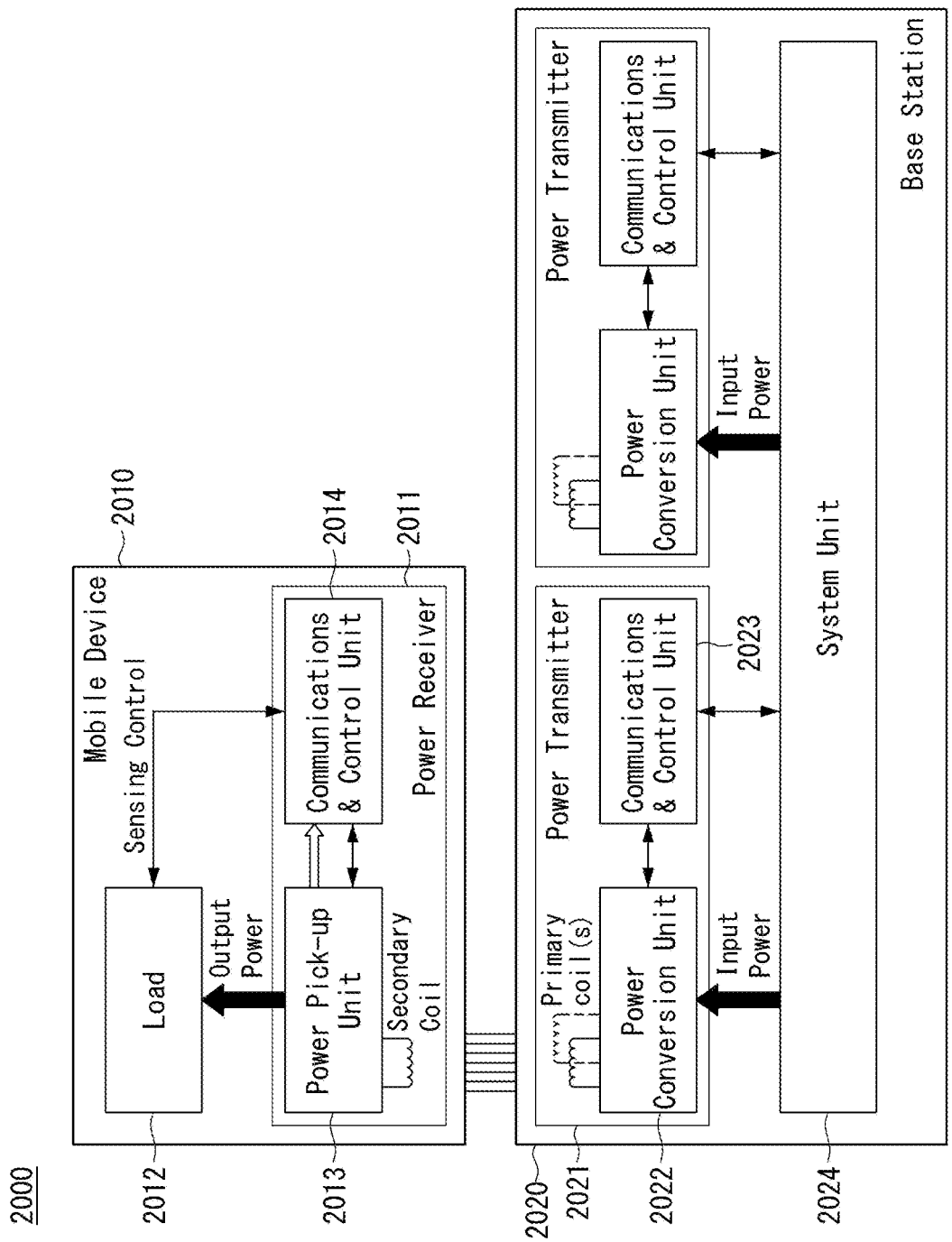

[Fig. 3]
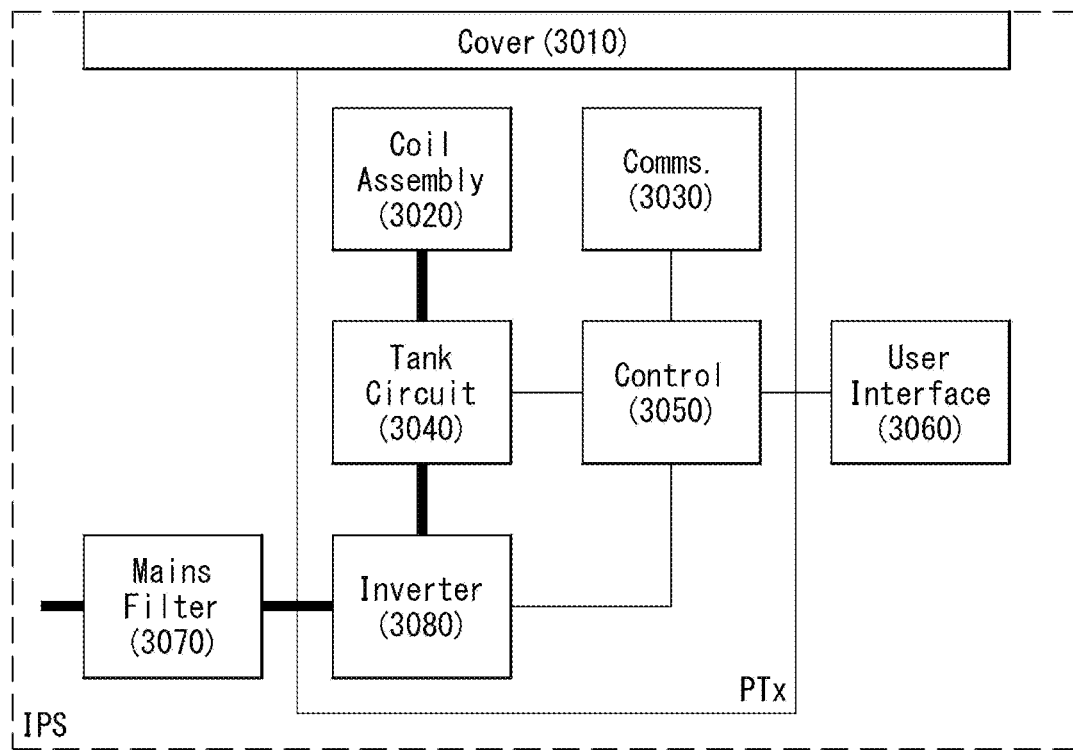
[Fig. 4]
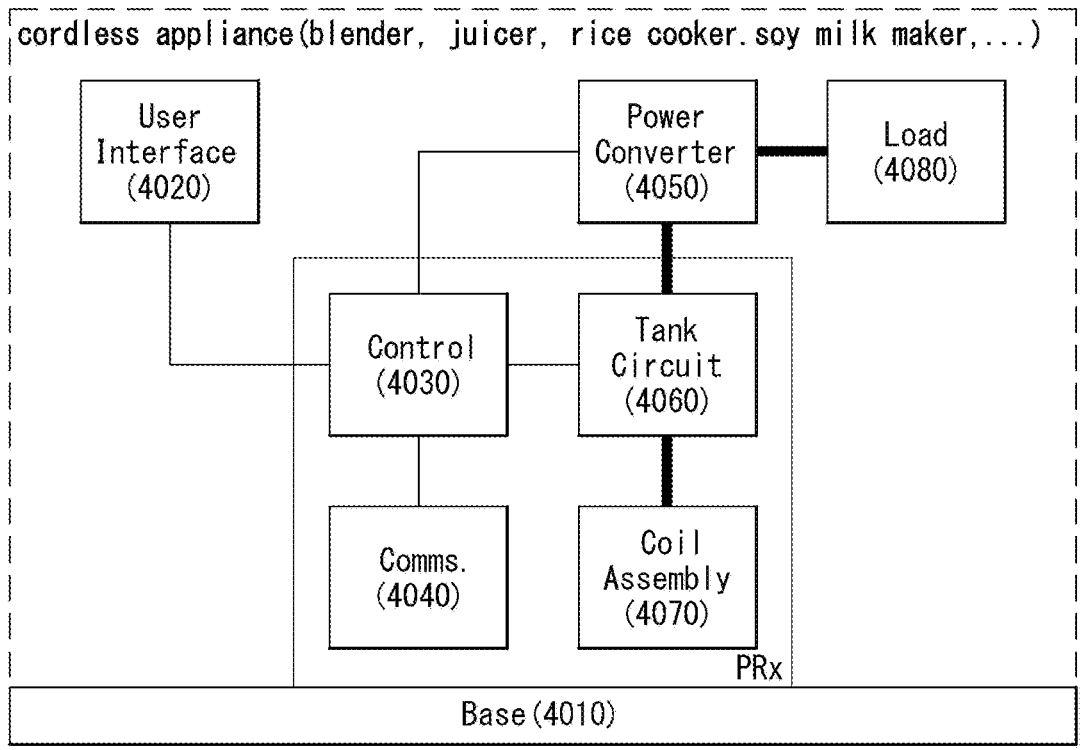

[Fig. 5]
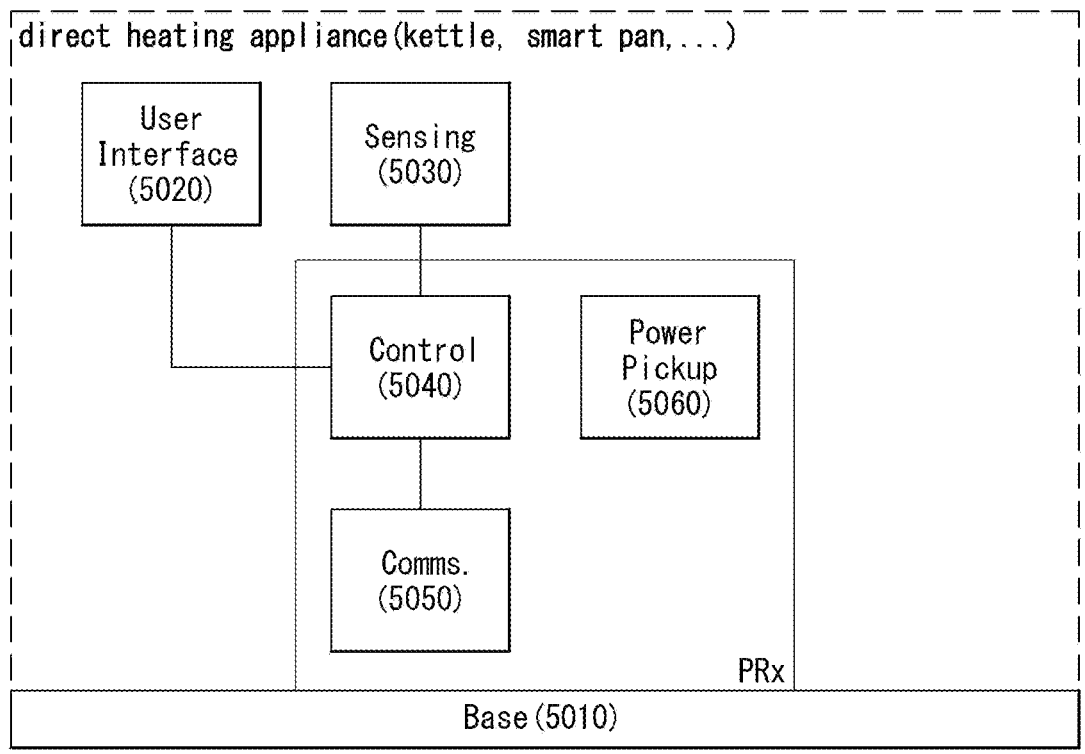
[Fig. 6]
| Class | Diameter | Mains condition | Max Power from the Mains | Guaranteed Power | example |
|---|---|---|---|---|---|
| A | 8-12cm | any | 250W | 200W | citrus press, hand blender |
| B | 13-17 | any | 1.4kW | 1.2kW | juicer, blender, small heating appliances |
| C | 18-24cm | 100V/15A<br>120V/12A<br>200V/10A<br>220V/10A<br>230V/10A<br>240V/10A | 1.5kW<br>1.5kW<br>2.0kW<br>2.2kW<br>2.3kW<br>2.4kW | 1.35kW<br>1.35kW<br>1.8kW<br>2.0kW<br>2.1kW<br>2.2kW | smart pan, kettle, rice cooker |

[Fig. 7]
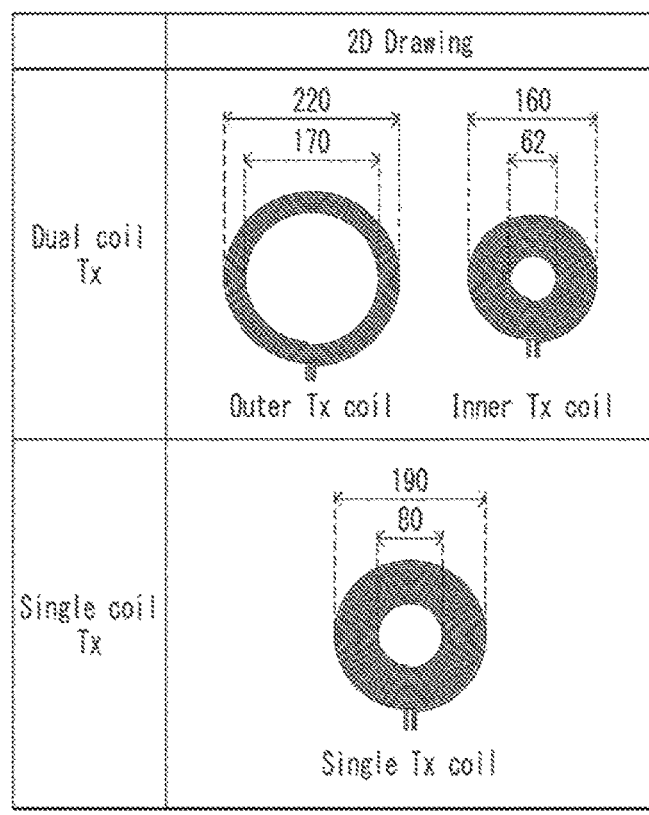
[Fig. 8]
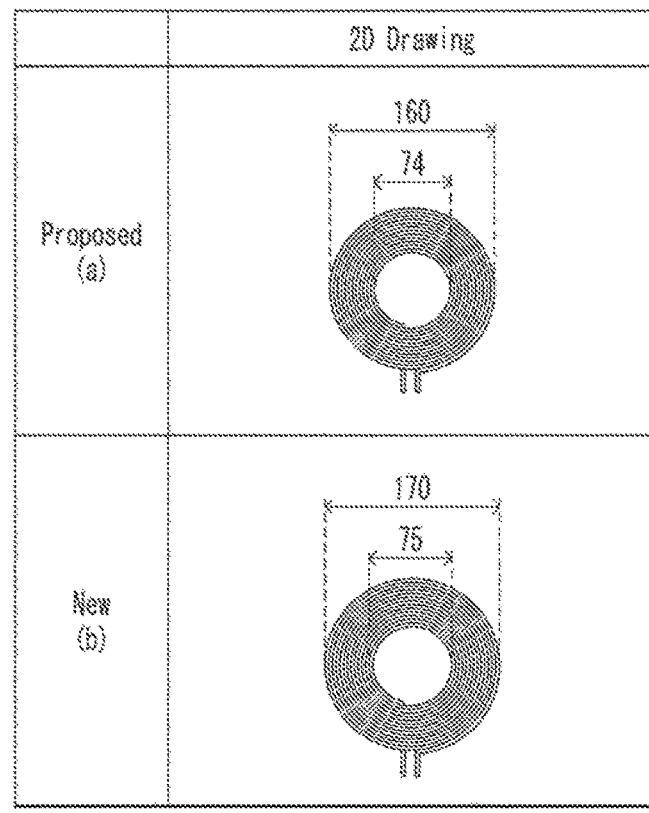

[Fig. 9]
(a)
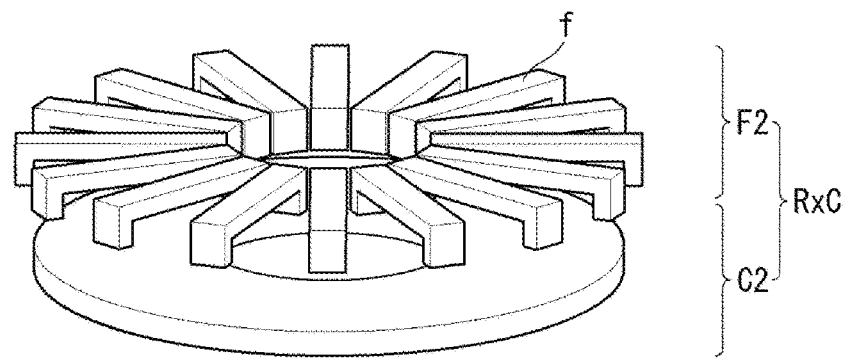
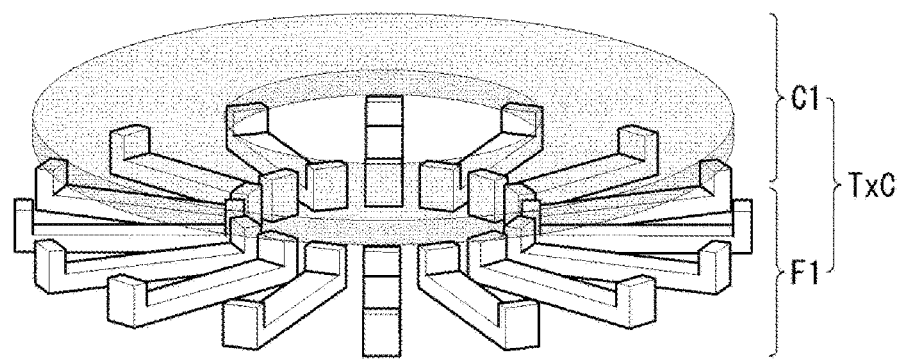
(b)
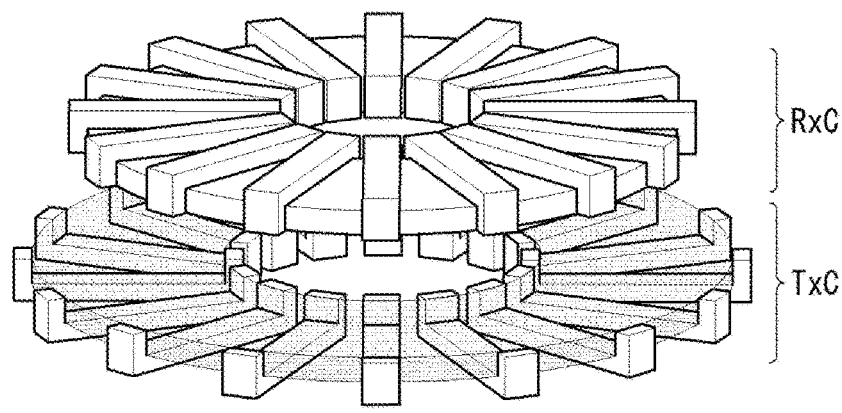

[Fig. 10]
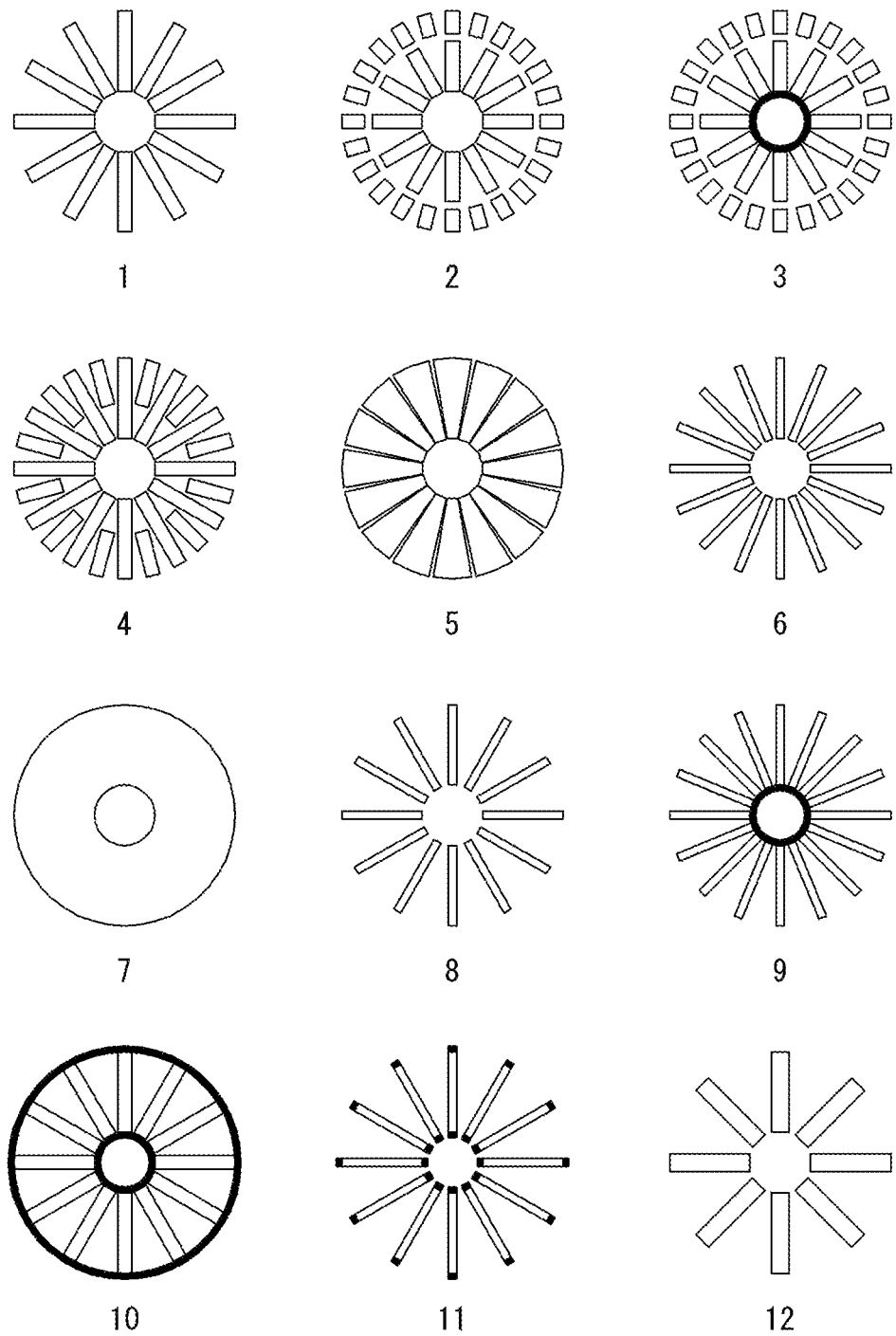

[Fig. 11]
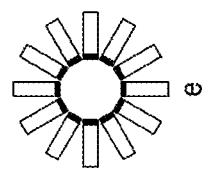
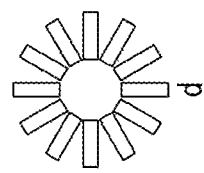
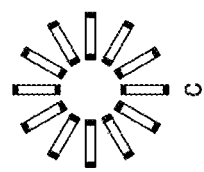
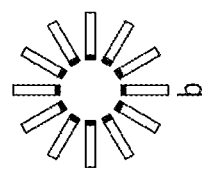
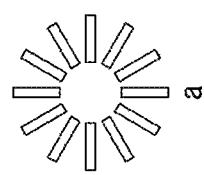
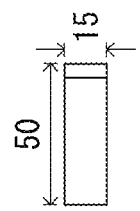
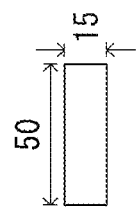
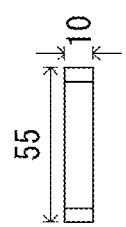
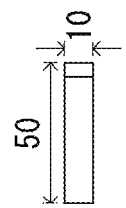
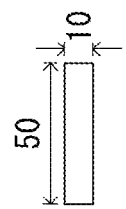
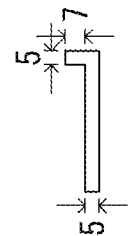
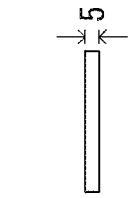
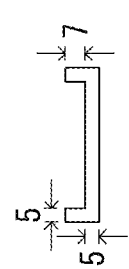
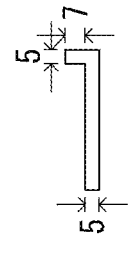
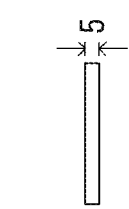
(a)      (b)      (c)

[Fig. 12]
(a)
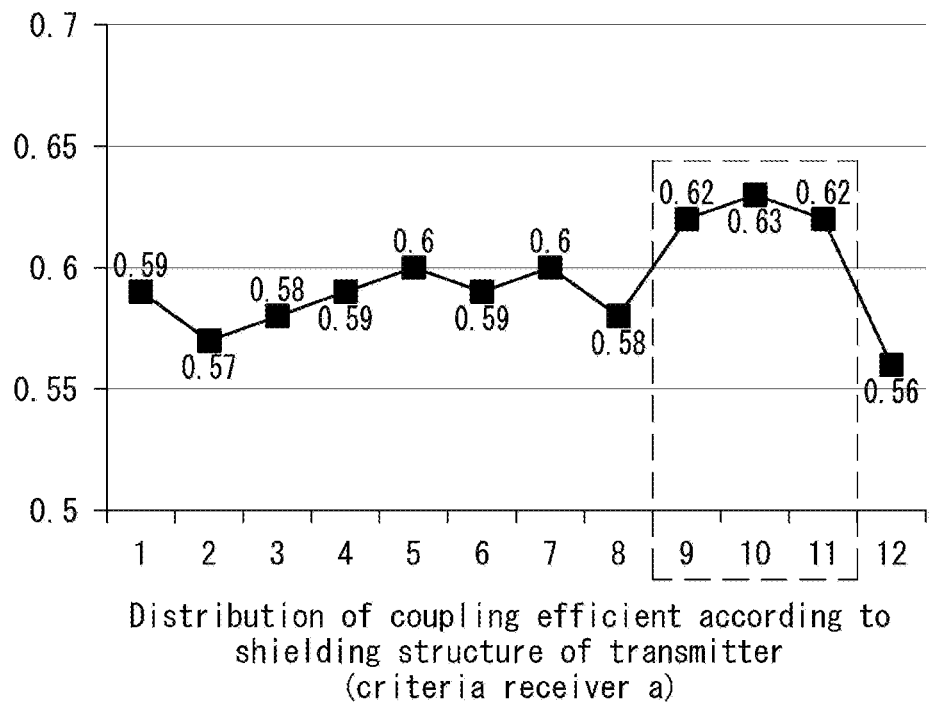
Distribution of coupling efficient according to shielding structure of transmitter (criteria receiver a)
(b)
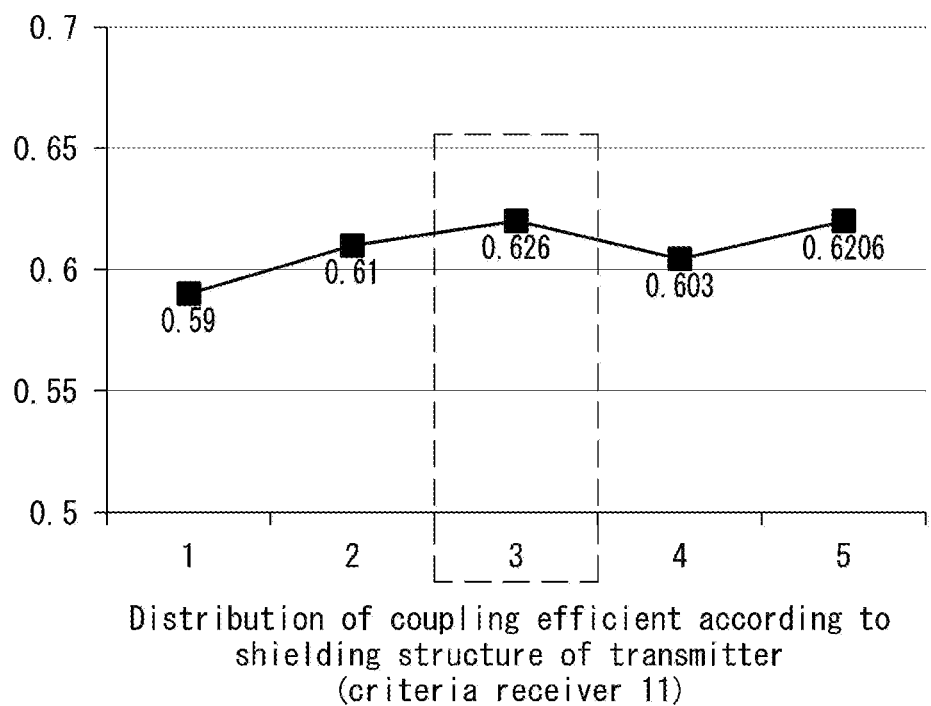
Distribution of coupling efficient according to shielding structure of transmitter (criteria receiver 11)

[Fig. 13]
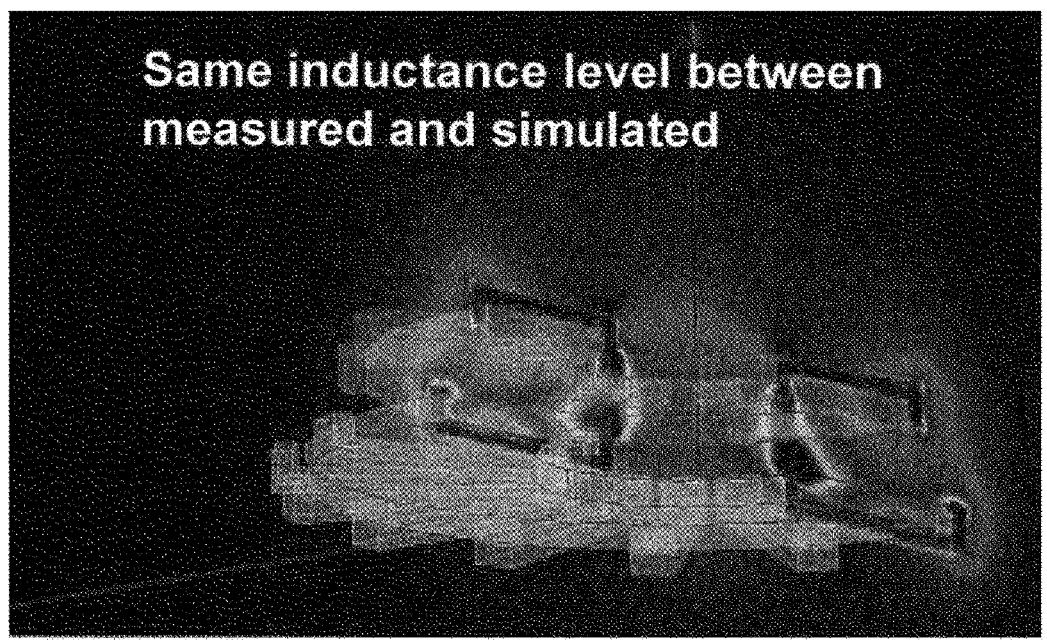
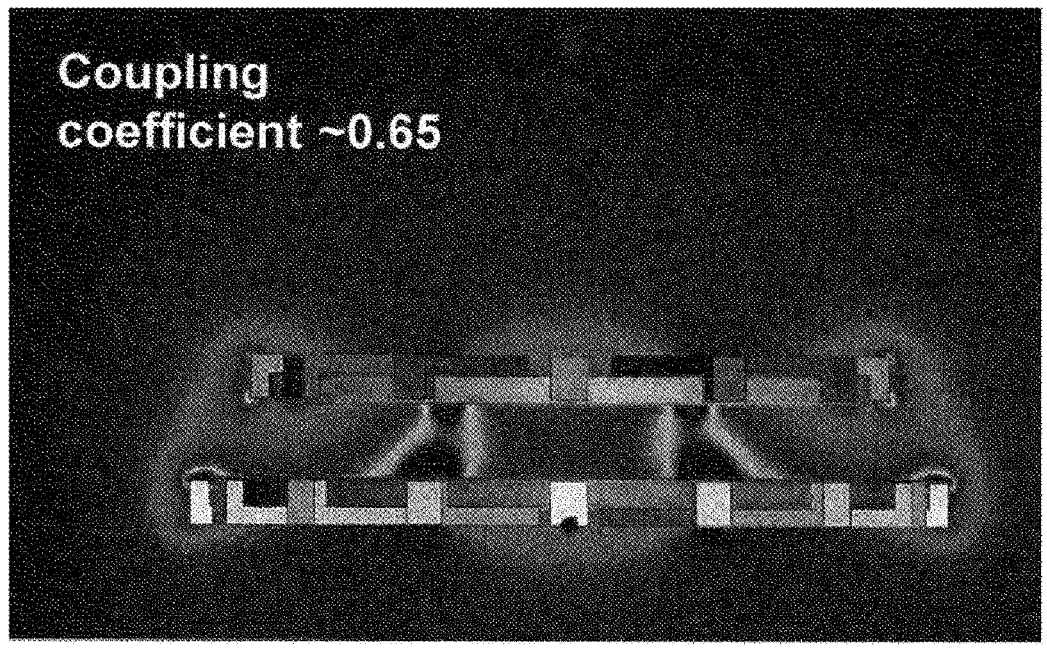

[Fig. 14]
(a)
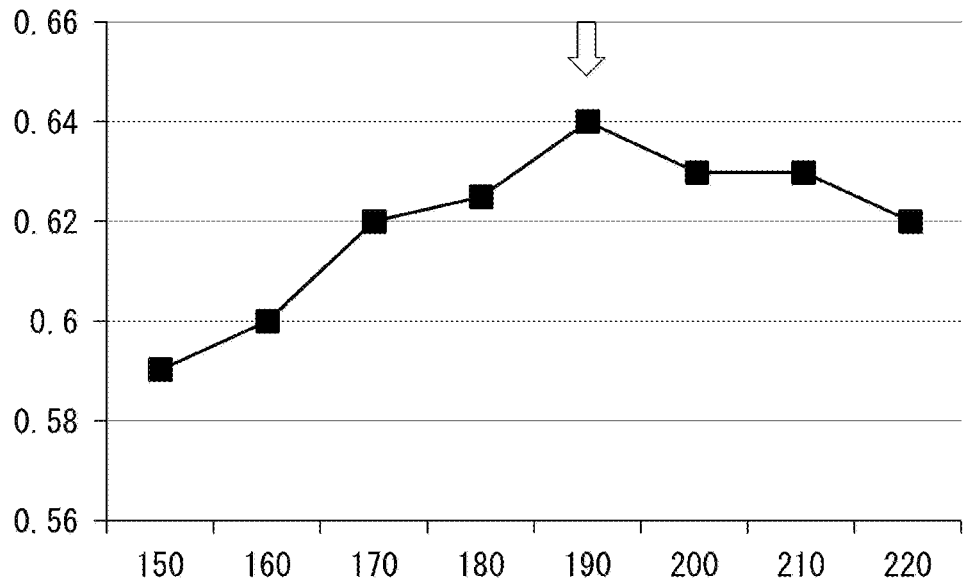
Coupling coefficient between transmission-reception units according to outer diameter (mm) of coil (inner diameter is fixed to 80 mm)
(b)
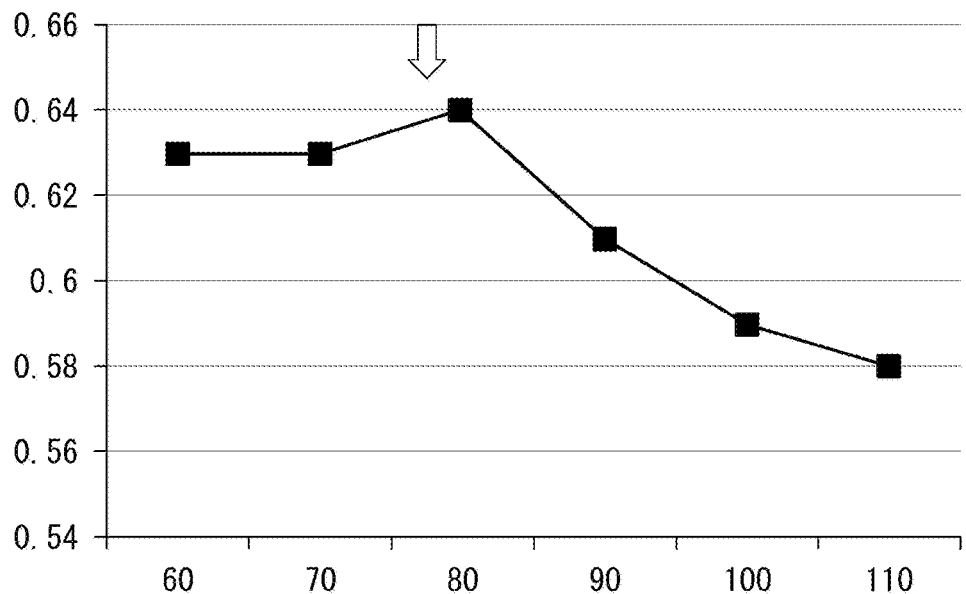
Coupling coefficient between transmission-reception units according to inner diameter (mm) of coil (outer diameter is fixed to 190 mm)

[Fig. 15]
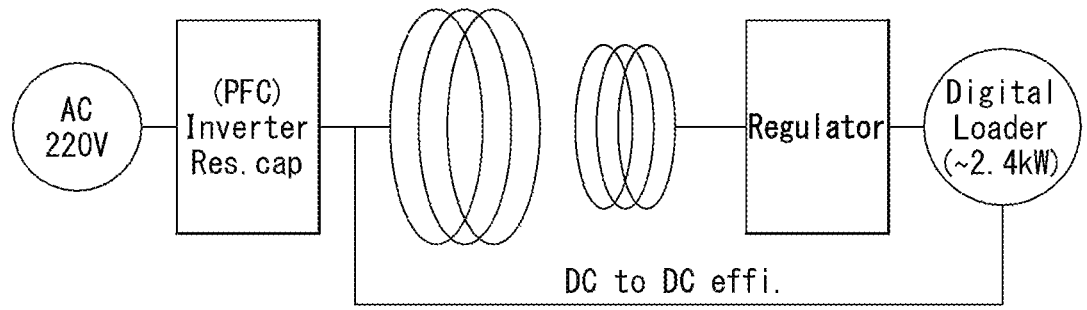
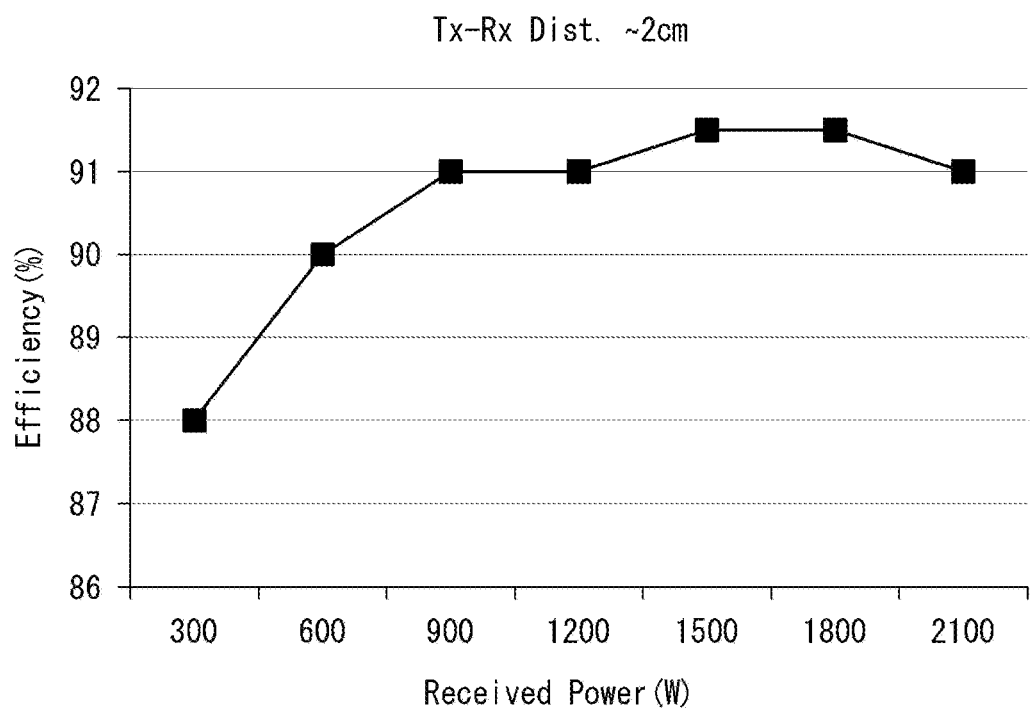

[Fig. 16]
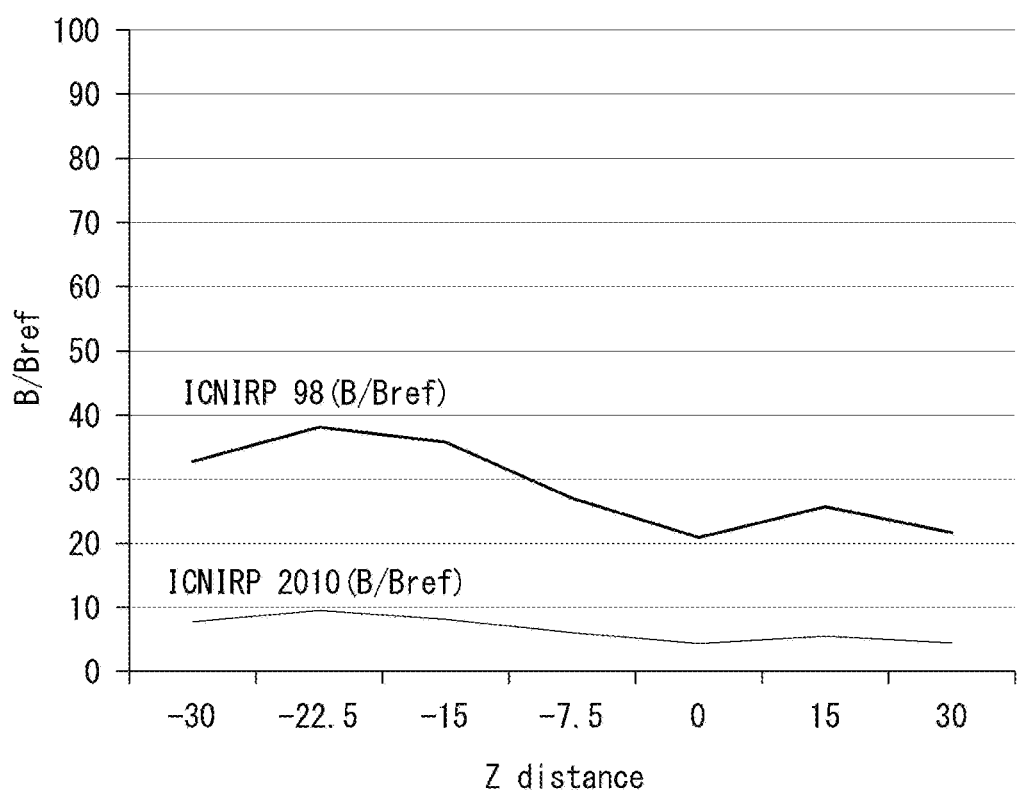

STRUCTURE OF WIRELESS POWER TRANSMISSION SYSTEM

CROSS REFERENCE TO RELATED APPLICATIONS

This application is the National Phase of PCT International Application No. PCT/KR2016/001652, filed on Feb. 18, 2016, which claims priority under 35 U.S.C. 119(e) to U.S. Provisional Application No. 62/174,278, filed on Jun. 11, 2015, all of which are hereby expressly incorporated by reference into the present application.

TECHNICAL FIELD

This specification is aimed at the resonant structure of a wireless power transmission system.

BACKGROUND ART

A contactless wireless power transmission system is an energy transfer method of electromagnetically transferring energy by removing a line in the existing method of transmitting energy through a wired line and using the energy as power for an electronic device. The contactless wireless power transmission system includes an electromagnetic induction method and a resonant method. The electromagnetic induction method is a method of generating, by a power transmission unit, a magnetic field through a power transmission coil (primary coil), locating a reception coil (secondary coil) at the place where current can be induced, and transferring power to the reception coil. In the resonant method, energy is transmitted using a resonant phenomenon between a transmission coil and a reception coil. A system in which the resonant frequency of the primary coil and the resonant frequency of the secondary coil are the same is configured to use resonant mode energy coupling between the coils.

The existing wireless power transmission system of the induction method is a product applied to a low energy portable device (smartphone) of maximum 5 W (based on the reception unit) and charging a portable device when it is placed on a wireless charger (transmission unit) without plugging a separate power line into the portable device, and has already been widely introduced in the market.

Recently, a technology for wirelessly transmitting higher power using a magnetic induction method, that is, the same principle, is introduced. An international standardization task for applying the technology to products is in progress.

Representative products to which high-output wireless power transmission using the magnetic induction method may be applied are home appliances for kitchen. Common home appliances for kitchen require transmission support of 200 W~2.4 kW power.

Accordingly, the present invention proposes a resonant structure, that is, a core element of a wireless power transmission system so that an appliance wirelessly operates when it is placed at a specific location of a table (if a transmission unit is located under the table) even without connecting a separate power line by applying a wireless power transmission system to such home appliances for kitchen.

DISCLOSURE

Technical Problem

This specification proposes a resonant structure capable of efficiently wirelessly transmitting power in a range of 200 W~2.4 kW (middle/high power) by applying a wireless power transmission technology based on a magnetic field to home appliances.

Technical Solution

In accordance with an embodiment of the present invention, a coil assembly for a wireless power transmitter includes a single coil including a wire and having a circular hole formed in the single coil; and a plurality of ferrites combined with the single coil. The outer diameter of the single coil may be about 185 mm or more and 195 mm or less, and the inner diameter of the single coil may be about 75 mm or more and 85 mm or less.

Furthermore, each of the plurality of ferrites includes first and second protrusions protruded in an identical direction, and the single coil may be inserted between the first and the second protrusions of the plurality of ferrites and combined with the plurality of ferrites.

Furthermore, the single coil may be formed by winding the wire by a predetermined number of turns.

Furthermore, the predetermined number of turns may be about 32 times or more and 33 times or less.

Furthermore, the single coil is formed by stacking two layers of the wire and may be a total of about 3.3 mm and 3.6 mm or less.

Furthermore, inductance of the coil assembly may be about 246 uH or more and 266 uH or less.

Furthermore, the initial permeability of ferrite of the plurality of ferrites may exceed 2500.

Furthermore, a wireless power transmitter according to another embodiment of the present invention includes a coil assembly including a coil generating a magnetic field; an inverter converting a DC signal into an AC signal; a tank circuit providing impedance matching between the inverter and the coil; a communication unit performing communication with a power receiver; and a control unit controlling power transfer. The coil assembly includes a single coil including a wire and having a circular hole formed in the single coil and a plurality of ferrites combined with the single coil. The outer diameter of the single coil may be about 185 mm or more and 195 mm or less, and the inner diameter of the single coil may be about 75 mm or more and 85 mm or less.

Furthermore, each of the plurality of ferrites includes first and second protrusions protruded in an identical direction, and the single coil may be inserted between the first and the second protrusions of the plurality of ferrites and combined with the plurality of ferrites.

Furthermore, the single coil may be formed by winding the wire by a predetermined number of turns.

Furthermore, the predetermined number of turns may be about 32 times or more and 33 times or less.

Furthermore, the single coil may be formed by stacking two layers of the wire and may be a total of about 3.3 mm and 3.6 mm or less.

Furthermore, inductance of the coil assembly may be about 246 uH or more and 266 uH or less.

Furthermore, the initial permeability of the plurality of ferrites may exceed 2500.

Furthermore, a coil assembly for a wireless power receiver according to another embodiment of the present invention includes a single coil including a wire and having a circular hole formed in the single coil; and a plurality of ferrites combined with the single coil. The outer diameter of the single coil is about 165 mm or more and 175 mm or less, and the inner diameter of the single coil is about 70 mm or more and 80 mm or less. Each of the plurality of ferrites includes first and second protrusions protruded in an identical direction. The single coil may be inserted between the first and the second protrusions of the plurality of ferrites and combined with the plurality of ferrites.

Advantageous Effects

In accordance with an embodiment of the present invention, there are effects in that system complexity is reduced, wireless charging of 200 W~2.4 kW can be supported, and the coupling of a system is high by applying the single coil structure to a wireless power transmission/reception system and a human body harmfulness possibility is reduced because the amount of electromagnetic waves emitted satisfies the EMF regulation (ICNIRP).

Furthermore, in accordance with an embodiment of the present invention, there is an effect in that wireless power transmission/reception efficiency is optimized by applying the single coil structure and the shield structure having a high coupling coefficient between a transmitter and a receiver.

In addition, various effects according to embodiments of the present invention are described in detail hereinafter.

DESCRIPTION OF DRAWINGS

FIG. 1 shows that electronic devices are classified depending on the amount of power received and transmitted in a wireless charging system.

FIG. 2 is a block diagram of a wireless power transmission/reception system according to an embodiment of the present invention.

FIG. 3 is a block diagram of an IPS according to an embodiment of the present invention.

FIG. 4 is a block diagram of a cordless appliance according to an embodiment of the present invention.

FIG. 5 is a block diagram of a direct heating appliance according to an embodiment of the present invention.

FIG. 6 is a table in which pieces of wireless power reception equipment have been classified by class depending on the amount of supportable power.

FIG. 7 is a diagram showing a dual coil structure and single coil structure included in a coil assembly for a wireless power transmitter.

FIG. 8 is a diagram showing single coil structures included in a coil assembly for a wireless power receiver.

FIG. 9 is a diagram showing a coil assembly for a wireless power transmitter/receiver according to an embodiment of the present invention.

FIG. 10 is a plan view of the shield structure of the coil assembly for a wireless power transmitter according to an embodiment of the present invention.

FIG. 11 show plan views, enlarged views and cross-sectional views of the shield structures of the coil assembly for a wireless power receiver according to an embodiment of the present invention.

FIG. 12 is a graph showing a distribution of coupling coefficients between the wireless power transmitter/receiver according to the shield structures shown in FIGS. 10 and 11.

FIG. 13 shows the simulation results of the measurement of electromagnetic waves of a wireless charging system in which No. 11 shield structure and No. c shield structure have been combined.

FIG. 14 is a graph showing a distribution of coupling coefficients between the wireless power transmitter/receiver according to the outer diameter and inner diameter length of a single coil for a wireless power transmitter coupled to the shield structure proposed in the present invention.

FIG. 15 is a graph showing power transmission efficiency of a wireless power transmitter/receiver according to an embodiment of the present invention.

FIG. 16 is a graph regarding electromagnetic waves B radiated by the wireless power transmitter/receiver according to an embodiment of the present invention.

BEST MODE

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names, but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

For the standardization of wireless power transmitter/receivers, Wireless Power Consortium (WPC) standardizes technologies related to wireless power transmission/reception.

A recently developed wireless charging system may support the transmission/reception of low power of about 5 W. In this case, there is a problem in that a charging time is long and efficiency is low in such a low power charging method because the size of a mobile device and the capacity of a battery are recently increased. Accordingly, a wireless charging system supporting the transmission/reception of middle power of about 15 W~20 W is developed. Furthermore, in order to improve charging efficiency, a wireless charging system to which a resonant method for simultaneously charging a plurality of electronic devices has been added is developed.

FIG. 1 shows an embodiment of various electronic devices into which a wireless power transmitting/receiving system is introduced.

FIG. 1 shows that electronic devices are classified depending on an amount of power that is transmitted and received in a wireless power transmitting/receiving system.

Referring to FIG. 1, a low power (about 5 W or less or about 20 W or less) wireless charging method may be applied to wearable devices, such as a smart watch, smart glass, a head mounted display (HMD), and a smart ring, and mobile electronic devices (or portable electronic devices), such as an earphone, a remote controller, a smart phone, a PDA, and a tablet PC. A middle power (about 50 W or less or about 200 W or less) wireless charging method may be applied to middle/small-sized home appliances, such as a notebook computer, a robot clearer, TV, audio equipment, and a monitor. A high power (about 2 kW or less or 22 kW or less) wireless charging method may be applied to kitchen equipment, such as a mixer, a microwave, and an electric rice cooker, and personal mobile devices (or electronic devices/mobile means), such as a wheel chair, an electric kickboard, an electric bicycle, and an electric vehicle.

Each of the aforementioned electronic devices/mobile means (or shown in FIG. 1) may include a wireless power receiver to be described later. Accordingly, the aforementioned electronic devices/mobile means may be wirelessly charged with power received from a wireless power transmitter.

Hereinafter, a mobile device to which a wireless power charging method is applied is basically described, but is only an embodiment. A wireless charging method according to the present invention may be applied to the aforementioned various electronic devices.

FIG. 2 is a block diagram of a wireless power transmission/reception system in accordance with an embodiment of the present invention.

Referring to FIG. 2, a wireless power transmission/reception system 2000 includes a mobile device 2010 configured to wirelessly receive power and a base station 2020 configured to wirelessly transfer (or transmit) power. Hereinafter, the mobile device may also be called a "power receiver product", and the base station may also be called a "power transmitter product."

The mobile device 2010 includes a power receiver 2011 for wirelessly receiving power through a secondary coil and a load 2012 for receiving power received by the power receiver 2011, storing the received power, and supplying the stored power to a device.

The power receiver 2011 may include a power pick-up unit 2013 and a communications & control unit 2014. The power pick-up unit 2013 may receive a wireless power signal through the secondary coil and convert the received signal into electric energy. The communications & control unit 2014 may control the transmission/reception of a power signal (or transfer/receive of power).

The base station 2020 is a device for providing inductive power or resonant power, and may include at least one power transmitter 2021 or a system unit 2024.

The power transmitter 2021 may send inductive power or resonant power and control such transmission. The power transmitter 2021 may include a power conversion unit 2022 configured to convert electric energy into a power signal by generating a magnetic field through a primary coil(s) and a communications & control unit 2023 configured to control communication and power transfer with the power receiver 2011 so that power of a proper level is transferred. The system unit 2024 may perform control of other operations of the base station 2020, such as input power provisioning, control of a plurality of power transmitters, and control of a user interface.

The power transmitter 2021 may control transmission power by controlling an operating point. The controlled operating point may correspond to a combination of a frequency (or phase), a duty cycle, a duty ratio, and voltage amplitude. The power transmitter 2021 may control transmission power by controlling at least one of a frequency (or phase), a duty cycle, a duty ratio, or voltage amplitude.

Furthermore, the power transmitter 2021 may supply constant power, and the power receiver 2011 may control reception power by controlling a resonant frequency.

Hereinafter, a coil or a coil unit may also be called a coil assembly, a coil cell, or a cell which includes a coil and at least one element close to the coil.

A wireless power transmission/reception system (or power transmitter and/or receiver) that transmits wireless power may operate in an inductive power transfer mode, an induction heating (IH) mode or a combination of the two modes.

In the inductive power transfer mode, the power transmitter 2021 may charge the power receiver 2011 by transmitting power (inductive or resonant power) to the power receiver.

In the IH mode, the power transmitter 2021 may heat the power receiver 2011 by transmitting power to the power receiver. The principle that the power transmitter 2021 heats the power receiver 2011 is related to a magnetic induction phenomenon. The magnetic induction phenomenon is a phenomenon in which a time-varying magnetic field, that is, a magnetic field that varies over time, generates an electromotive force in a conductor located at a proper location. If the conductor is made of a sheet of metal, the electromotive force enables an eddy current to flow into the conductor, thereby being capable of heating the conductor. Such a phenomenon is also known as an induction heating effect. Various home appliances used at homes, such as an induction range for cooking or an IH pressure cooker, using the induction heating effect are recently being released.

Power transmission equipment and power reception equipment of the wireless transmission/reception system that operates in the IH mode and/or the inductive power transfer mode are described in more detail below.

The power transmission equipment may be hereinafter referred to as an "inductive power supply (IPS)." Furthermore, hereinafter, the power reception equipment may be basically divided into a "cordless appliance (or indirect heating appliance)" and a "direct heating appliance." The cordless appliance may be an appliance which receives power (inductive or resonant power) from the IPS, converts the power into electrical power, and uses the electric power to drive a motor and/or a heating element. Accordingly, the cordless appliance may operate in an induction power transmission (or reception) mode. Furthermore, the direct heating appliance may be an appliance in which flat metal included in a base is directly heated by induction heating. Accordingly, the direct heating appliance may operate in the inductive power transfer mode and/or the IH mode.

FIG. 3 is a block diagram of the IPS according to an embodiment of the present invention.

Referring to FIG. 3, the IPS may include at least one of a cover 3010 covering the IPS, a mains filter (or power adaptor) 3070 supplying power to a power transmitter PTx, the power transmitter PTx transmitting wireless power, and a user interface 3060 providing a power transfer progress and other related information. In particular, the user interface 3060 may be optionally included in the IPS or may be included as another user interface of the IPS.

The power transmitter PTx, that is, the core element of the IPS, may include at least one of a coil assembly 3020, a tank circuit (or impedance matching circuit) 3040, an inverter 3080, a communication unit 3030 and a control unit 3050.

The coil assembly 3020 may include a frame (or ferrite/ferrite leg) including (or carrying) a ferrite element in addition to at least one coil in order to generate a magnetic field.

The tank circuit 3040 may include an energy storage capacitor and additional impedance matching elements.

The inverter 3080 may convert DC input into an AC signal. The inverter 3080 includes a full-bridge topology and may support frequency control and a duty cycle.

The communication unit 3030 separately includes a separated coil having the same center as a power coil, and may perform communication with a power receiver PRx by transmitting power using the separated coil. Such a configuration provides a spatially localized communication protocol (power line communication: in-band communication) to guarantee (1:1) communication execution with an appliance to which power is provided by the IPS. In this case, time division multiplexing may be used as a power line communication protocol.

The control unit 3050 may control the aforementioned elements of the IPS. In particular, the control unit 3050 may control the communication and power transfer of the power transmitter PTx. Furthermore, the control unit 3050 may perform various embodiments described in this specification by controlling at least one of the aforementioned elements of the IPS.

The aforementioned elements of the IPS may be provided as separate units/devices/chipsets or may be provided as a single unit/device/chipset. For example, the communication unit 3030 and the control unit 3050 may be provided as separate devices/chipsets or may be provided as a single device/chipset. Furthermore, the aforementioned elements of the IPS may be optionally included or a new element may be added to the IPS.

FIG. 4 is a block diagram of a cordless appliance according to an embodiment of the present invention. In this specification, the cordless appliance indicates an electrically-power and/or indirect heating appliance wirelessly charged by the IPS, such as a blender, a juicer, a rice cooker and a soy milk maker.

Referring to FIG. 4, the cordless appliance may include at least one of a user interface 4020 providing a power reception progress and other related information, a power receiver PRx receiving wireless power, a load circuit 4080 and a base 4010 covering or supporting the cordless appliance. In particular, the user interface 4020 may be optionally included in the cordless appliance or may be included as another user interface of the cordless appliance.

The power receiver PRx, that is, the center element of the cordless appliance, may include at least one of a power converter 4050, a tank circuit (or impedance matching circuit) 4060, a coil assembly 4070, a communication unit 4040 and a control unit 4030.

The power converter 4050 may convert AC power, received from a secondary coil, into a voltage and current suitable for the load circuit. The power converter 4050 may include a rectifier. In this case, the rectifier may have a full-wave rectification topology. Additionally, the power converter 4050 may adapt reflected impedance of the power receiver PRx.

The tank circuit 4060 may include an energy storage capacitor and additional impedance matching elements.

The coil assembly 4070 may include a frame (or ferrite) including (or carrying) a ferrite element in addition to at least one coil in order to generate a magnetic field.

The communication unit 4040 separately includes a separated coil having the same center as a power coil, and may perform communication with the power transmitter PTx by transmitting power using the separated coil. Such a configuration provides a spatially localized communication protocol (power line communication: in-band communication) and guarantees communication execution with the IPS that provides power to the cordless appliance.

The control unit 4030 may control the aforementioned elements of the cordless appliance. In particular, the control unit 4030 may control the communication and power reception of the power receiver PRx. Furthermore, the control unit 4030 may perform various embodiments described in this specification by controlling at least one of the aforementioned elements of the cordless appliance.

The aforementioned elements of the cordless appliance may be provided as separate units/devices/chipsets or may be provided as a single unit/device/chipset. For example, the communication unit 4040 and the control unit 4030 may be provided as separate devices/chipsets or may be provided as a single device/chipset. Furthermore, the aforementioned elements of the cordless appliance may be optionally included or a new element may be added to the cordless appliance.

FIG. 5 is a block diagram of a direct heating appliance according to an embodiment of the present invention. In this specification, the direct heating appliance indicates various home appliances directly heated using induction heating, such as a kettle, a coffee port and a smart pan.

Referring to FIG. 5, the direct heating appliance may include at least one of a user interface 5020 providing a power reception progress and other related information, a power receiver PRx receiving wireless power, a base 5010 including a metal material and covering or supporting the direct heating appliance, and a sensor unit 5030. In particular, the user interface 5010 may be optionally included in the direct heating appliance or may be included as another user interface of the direct heating appliance.

The power receiver PRx, that is, the center element of the direct heating appliance, may include at least one of a power pickup unit 5060, a communication unit 5050 and a control unit 5040.

The power pickup unit 5060 may receive power from the IPS and drive the direct heating appliance.

The communication unit 5050 separately includes a separated coil having the same center as a power coil and may perform communication with the power transmitter PTx by transmitting power using the separated coil. Such a configuration provides a spatially localized communication protocol (power line communication: in-band communication) and guarantees communication execution with the IPS that provides power to the direct heating appliance.

The sensor unit 5030 may sense and/or monitor the temperature of the direct heating appliance.

The control unit 5040 may control the aforementioned elements of the direct heating appliance. In particular, the control unit 5040 may control the communication and power reception of the power receiver PRx. Furthermore, the control unit 5040 may perform various embodiments described in this specification by controlling at least one of the aforementioned elements of the direct heating appliance.

The aforementioned elements of the direct heating appliance may be provided as separate units/devices/chipsets or may be provided as a single unit/device/chipset. For example, the communication unit 5050 and the control unit 5040 may be provided as separate devices/chipsets or may be provided as a single device/chipset. Furthermore, the aforementioned elements of the direct heating appliance may be optionally included or a new element may be added to the direct heating appliance.

FIG. 6 is a table in which pieces of wireless power reception equipment have been classified by class depending on the amount of supportable power.

Referring to FIG. 6, wireless power reception equipment supporting middle power wireless charging of about 200~250 W may be classified as Class A, wireless power reception equipment supporting high power wireless charging of about 1.2 kW ~1.4 kW may be classified as Class B, and wireless power reception equipment supporting high power wireless charging of about 1.5 kW~2.4 kW may be classified as Class C.

This specification proposes a single coil structure as an efficient coil structure which may be applied to the wireless power reception equipment of Class A~Class C (basically Class B and Class C) and wireless power transmission equipment corresponding to the wireless power reception equipment. The single coil structure is described in detail hereunder.

FIG. 7 is a diagram showing a dual coil structure and single coil structure included in a coil assembly for a wireless power transmitter.

Referring to FIG. 7, both a dual/single coil may have a doughnut form (or ring form) having a circular hole therein. The dual/single coil may be formed by winding a wire by a predetermined number of turns. In this case, a Litz wire having an outer diameter of about 3.3~3.6 mm, a session diameter of about 0.1 mm, and 400~600 strands may be used as the wire.

The dual coil may include two types of coils: an outer coil (or primary coil) and an inner coil (or secondary coil). The outer diameter and inner diameter of the outer coil are greater than the outer diameter and inner diameter of the inner coil. For example, the outer diameter of the outer coil may be about 220 mm, and the inner diameter thereof may be about 170 mm. The outer diameter of the inner coil may be about 160 mm, and the inner diameter thereof may be about 62 mm. The inner coil is located in the circular hole formed within the outer coil, thereby forming a dual coil structure.

Unlike the dual coil, the single coil may include one coil. In this case, the outer diameter and inner diameter of the single coil may be selected to have the length having the best wireless power transmission efficiency performance. This specification proposes that about 190 (±5) mm is selected as the outer diameter of the single coil and about 80 (±5) mm is selected as the inner diameter of the single coil. Efficiency improvement results according to the selection of the length as the lengths of the outer diameter and inner diameter are described in detail below in relation to FIGS. 14 to 17.

In the dual coil, the inner coil is capable of wireless power transmission support in a range of about 200 W~2 kW, whereas the use of the outer coil may be limited because some wireless power reception equipment is required to support wireless charging of 2 kW or more. Moreover, the dual coil has high system complexity due to such a limit (two coils are present).

In contrast, the single coil structure has advantages in that it has low system complexity (one coil is present), can support wireless charging of about 200 W~2.4 kW, has high system coupling, and has a low human body harmfulness possibility because the amount of electromagnetic waves emitted satisfies EMF regulation (ICNIRP).

FIG. 8 is a diagram showing single coil structures included in a coil assembly for a wireless power receiver. More specifically, FIG. 8(*a*) is a coil structure for a wireless power receiver corresponding to a wireless power transmitter including a dual coil. FIG. 8(*b*) is a coil structure for a wireless power receiver corresponding to a wireless power transmitter including a single coil.

Referring to FIG. 8, each single coil may have a doughnut form (or ring form) having a circular hole therein, and may be formed by circularly winding a wire (e.g., Litz wire) by a predetermined number of turns.

The single coil (FIG. 8(*a*)) for a wireless power receiver corresponding to the dual coil may have an outer diameter of about 160 mm and an inner diameter of about 74 mm.

The outer diameter and inner diameter of the single coil (FIG. 8(*b*)) for a wireless power receiver corresponding to the single coil may be selected as the length having the best wireless power reception efficiency performance. This specification proposes that about 170 (±5) mm is selected as the outer diameter and about 75 (±5) mm is selected as the inner diameter.

FIG. 9 is a diagram showing a coil assembly for a wireless power transmitter/receiver according to an embodiment of the present invention. More specifically, FIG. 9(*a*) is an exploded perspective view of coil assemblies TxC and RxC for a wireless power transmitter/receiver, and FIG. 9(*b*) is a perspective view of coil assemblies TxC and RxC for a wireless power transmitter/receiver.

Referring to FIG. 9, both single coils C1 and C2 for a wireless power transmitter/receiver proposed in the present invention may be coupled to one or more ferrites F1 and F2. The ferrites F1 and F2 have a function of minimizing electromagnetic waves (or an electric field) that leak from the single/dual coil and raising wireless power efficiency between the transmitter/receiver (i.e., coupling coefficient rise).

The one or more ferrites F1 and F2 may be coupled to the single coils C1 and C2, and may be located on one surface of the single coil C1 for a wireless power transmitter and one surface of the single coil C2 for a wireless power receiver. In the case of this drawing, the plurality of ferrites F1 and F2 may be located at the bottom of the single coil C1 for a wireless power transmitter and the top of the single coil C2 for a wireless power transmitter.

Each ferrite f may have various forms. In the case of this drawing, the ferrite f has a '⊏'-shaped form having first and second protrusions protruded in the same direction. In this case, the single coil C1, C2 may be inserted between the first and the second protrusions and coupled to the ferrite f. However, the present invention is not limited thereto. The ferrite f may be configured in a form capable of minimizing leakage electromagnetic waves and improving wireless power efficiency. Furthermore, if the plurality of ferrites F1 and F2 is included in the coil assemblies TxC and RxC, they may be arranged according to a predetermined rule and coupled to the single coils C1 and C2 in order to achieve the aforementioned object.

Hereinafter, various shield structures which may be applied to the coil assemblies TxC and RxC for a wireless power transmitter/receiver of the present invention are introduced. A shield structure having the best performance from among the various shield structures is proposed as a shield structure to be applied to the coil assemblies TxC and RxC for a wireless power transmitter/receiver.

FIG. 10 is a plan view of the shield structure of the coil assembly for a wireless power transmitter according to an embodiment of the present invention.

Referring to FIG. 10, the shield structure applicable to the coil assembly for a wireless power transmitter may be various. More specifically, the shape of each ferrite and the arrangement structure of a plurality of ferrites as a shield structure may be determined in various manners depending on embodiments. In this specification, a total of 12 types of shield structures Nos. 1~12 are introduced. In FIG. 10, a black area indicates a protrusion. For reference, No. 11 shield structure is the same as the shield structure for a wireless power transmitter shown in FIG. 9.

FIG. 11 show plan views, enlarged views and cross-sectional views of the shield structures of the coil assembly for a wireless power receiver according to an embodiment of the present invention.

Referring to FIG. 11, the shield structure applicable to the coil assembly for a wireless power receiver may be various. More specifically, the shape of each ferrite and the arrangement structure of a plurality of ferrites as the shield structure may be determined in various manners depending on embodiments. In this specification, a total of 5 types of shield structures No. a~No. e are introduced. FIG. 11(a) shows plan views of the 5 types of ferrites, FIG. 11(b) shows plan views of one ferrite forming each of the shield structures shown in FIG. 11(a), and FIG. 11(c) is cross-sectional views of the respective ferrites shown in FIG. 11(b). Black areas in FIGS. 11(a) and 11(b) show protrusions. The unit of the length shown in FIGS. 11(b) and 11(c) is mm. For reference, No. c shield structure is the same as the shield structure for a wireless power receiver shown in FIG. 9.

FIG. 12 is a graph showing a distribution of coupling coefficients between the wireless power transmitter/receiver according to the shield structures shown in FIGS. 10 and 11. In this case, a distribution of coupling coefficients is an index indicating that how much has the wireless power transmitter and the wireless power receiver been well combined. As a distribution of coupling coefficients rises, this means that wireless power transmission efficiency is high.

A distribution of coupling coefficients according to the shield structure of the wireless power transmitter shown in FIG. 12(a) was measured based on the wireless power receiver having No. a shield structure of FIG. 11. Furthermore, a distribution of coupling coefficients according to the shield structure of the wireless power transmitter shown in FIG. 12(b) was measured based on the wireless power receiver having No. 11 shield structure of FIG. 10.

Referring to FIG. 12(a), it was revealed that distributions of the coupling coefficients of Nos. 9~11 shield structures were 0.62 or more. That is, as the results of the measurement of the coupling coefficient of each shield structure for the transmitter, it was revealed that Nos. 9~11 shield structures had the highest wireless power transmission efficiency. Accordingly, this specification proposes that Nos. 9~11 shield structures are used as the shield structure for the wireless power transmitter.

Referring to FIG. 12(b), it was revealed that a distribution of the coupling coefficients of No. c shield structure was the highest of 0.626. That is, as the results of the measurement of the coupling coefficient of each shield structure for the receiver, it was revealed that No. c shield structures had the highest wireless power transmission efficiency. Accordingly, this specification proposes that No. c shield structure is used as the shield structure for the wireless power receiver corresponding to Nos. 9~11 shield structures for the wireless power transmitter.

Hereinafter, the wireless power system (refer to FIG. 9) to which No. 11 shield structure has been applied as the shield structure for the wireless power transmitter and No. c shield structure has been applied as the shield structure for the wireless power receiver is basically described.

FIG. 13 shows the simulation results of the measurement of electromagnetic waves of the wireless charging system in which No. 11 shield structure and No. c shield structure have been combined.

Referring to FIG. 13, it was found that the wireless power system to which Nos. 11 and c shield structures have been applied had a coupling coefficient rising up to a maximum of 0.65 and thus had very high power transmission efficiency.

FIG. 14 is a graph showing a distribution of coupling coefficients between the wireless power transmitter/receiver according to the outer diameter and inner diameter length of a single coil for a wireless power transmitter coupled to the shield structure proposed in the present invention. In particular, FIG. 14(a) shows a distribution of coupling coefficients between the wireless power transmitter/receiver according to the outer diameter of a corresponding single coil when the inner diameter of the single coil for a wireless power transmitter is fixed to 80 mm if Nos. 11 and c shield structures have been applied. FIG. 14(b) shows a distribution of coupling coefficients between the wireless power transmitter/receiver according to the inner diameter of a corresponding single coil when the outer diameter of the single coil for a wireless power transmitter is fixed to 190 mm if Nos. 11 and c shield structures have been applied.

Referring to FIG. 14(a), it was found that when the outer diameter of the single coil was 190 mm, the coupling coefficient had the highest of 0.64. That is, it was found that when the outer diameter of the single coil was 190 mm, wireless power transmission efficiency has the highest.

Referring to FIG. 14(b), it was found that when the inner diameter of the single coil was 80 mm, the coupling coefficient had the highest of 0.64. That is, it was found that when the inner diameter of the single coil was 80 mm, wireless power transmission efficiency had the highest.

Detailed physical characteristics of the single coil for the wireless power transmitter may be proposed as in Table 1 based on such experiment results.

TABLE 1

|  | Dual coil Tx | | Single coil Tx |
| --- | --- | --- | --- |
|  | Tx_out | Tx_in | Tx single |
| No. of Turns | 14 ± 1 | 28 ± 2 | 32 ± 1 |
| Outer diameter (mm)/ | 220 ± 5 | 160 ± 5 | 190 ± 5 |
| Inner diameter (mm) | 170 ± 5 | 62 ± 5 | 80 ± 5 |
| No. of Layer/Total Thickness |  | 2/3.3~3.6 |  |
| Inductance(with ferrite, μH) | 95 ± 10 | 168 ± 10 | 256 ± 10 |
|  | 400(in serial connection) | | — |
| Initial permeability of ferrite | Over 2500($\mu i$ = 3200, Bs 530 mT) | | |

Referring to Table 1, the outer diameter of the single coil for the wireless power transmitter may be determined to be 190 (±5) mm, and the inner diameter thereof may be determined to be 80 (±5) mm. They have been determined to be the lengths having the best wireless power efficiency based on the simulation results. Furthermore, the single coil may be configured by stacking two layers of a wire rotated by the number of turns of about 32 (±1). In this case, the single coil may have a thickness of about 3.3 mm~3.6 mm. Furthermore, the single coil combined with the ferrites may have inductance of about 256 (±10) uH. In addition, the remaining physical characteristics of the single coil are substantially the same as the dual coil.

Furthermore, detailed physical characteristics of the single coil for the wireless power receiver to which No. c shield structure has been applied, corresponding to the aforementioned wireless power transmitter, may be proposed as in Table 2 below.

TABLE 2

|  | Single coil Rx |
| --- | --- |
| No. of Turns | 28 ± 1 |
| Outer diameter (mm)/ | 170 ± 5 |
| Inner diameter (mm) | 75 ± 5 |
| No. of Layer/Total Thickness | 2/3.3~3.6 |
| Initial permeability of ferrite | Over 2500 (μi = 3200, Bs 530 mT) |

Referring to Table 2, the outer diameter of the single coil for the wireless power receiver may be determined to be about 170 (±5) mm, and the inner diameter thereof may be determined to be about 75 (±5) mm. Furthermore, the single coil may be configured by stacking two layers of a wire rotated by the number of turns of about 28 (±1). In this case, the single coil may have a thickness of about 3.3 mm 3.6 mm.

FIG. 15 is a graph showing power transmission efficiency of the wireless power transmitter/receiver according to an embodiment of the present invention. In experiments for obtaining this graph, the distance (i.e., z-distance) between the wireless power transmitter and the wireless power receiver was maintained as 2 cm or less.

Referring to FIG. 15, it was revealed that wireless power transmission/reception efficiency of the wireless power transmitter/receiver to which the structure proposed in this specification was applied maintained 88% or more and thus had high efficiency. In particular, it was revealed that the wireless power transmitter/receiver of the present invention had the highest wireless power transmission efficiency if received power was about 1500 W~1800 W.

FIG. 16 is a graph regarding electromagnetic waves B radiated by the wireless power transmitter/receiver according to an embodiment of the present invention. Experiments for obtaining this graph were performed according to the standard electromagnetic waves measurement method introduced in IEC62233, and a wireless power transmission/reception situation of about 2.1 kW was assumed. Furthermore, a value determined in ICNIRP 98 and ICNIRP 2010 was used as a reference electromagnetic waves (Bref) value.

Referring to FIG. 16, it could be seen that regardless of the z-distance, B/Bref maintained 40 (if Bref was ICNIRP 98) or 10 or less (if Bref was ICNIRP 2010). That is, from the graph of FIG. 16, it could be seen that the wireless power transmitter/receiver of the present invention satisfied all of pre-regulated electromagnetic waves radiation criteria.

The drawings have been divided and described for convenience of description, but the embodiments described with reference to the drawings may be merged and designed to implement new embodiments. Furthermore, the above-described device is not limited and applied to the configurations and methods of the aforementioned embodiments, but some or all of the embodiments may be selectively combined and configured so that the embodiments are modified in various ways.

Furthermore, although some embodiments of this specification have been illustrated and described, this specification is not limited to the aforementioned specific embodiments and may be modified in various ways by those skilled in the art to which this specification pertains without departing from the gist of this specification claimed in the claims. The modified embodiments should not be individually interpreted from the technical spirit or prospect of this specification.

[Mode for Invention]

Various embodiments have been described in a best mode for executing the present invention.

INDUSTRIAL APPLICABILITY

The present invention may be applied to various wireless charge technologies.

The invention claimed is:

1. A coil assembly for a wireless power transmitter, the coil assembly comprising:
    a single coil comprising a wire and having a circular hole formed in the single coil; and
    a plurality of ferrites combined with the single coil,
    wherein an outer diameter of the single coil is about 185 mm or more and 195 mm or less,
    wherein an inner diameter of the single coil is about 75 mm or more and 85 mm or less, and
    wherein the single coil is formed by stacking two layers of the wire, and a thickness of the single coil is a total about 3.3 mm or more and 3.6 mm or less.

2. The coil assembly of claim 1, wherein:
    each of the plurality of ferrites comprises a first protrusion and a second protrusion protruded in an identical direction, and
    the single coil is inserted between the first and second protrusions of the plurality of ferrites and combined with the plurality of ferrites.

3. The coil assembly of claim 1, wherein the single coil is formed by winding the wire by a predetermined number of turns.

4. The coil assembly of claim 3, wherein the predetermined number of turns is in a range of about 32 times or more and 33 times or less.

5. The coil assembly of claim 1, wherein an inductance of the coil assembly is about 246 uH or more and 266 uH or less.

6. The coil assembly of claim 1, wherein an initial permeability of the plurality of ferrites exceeds about 2500.

7. A wireless power transmitter, comprising:
    a coil assembly comprising a coil generating a magnetic field;
    an inverter configured to convert a DC signal into an AC signal;
    a tank circuit configured to provide impedance matching between e inverter and the coil;
    a communication unit configured to perform communication with a power receiver; and
    a control unit configured to control power transfer,
    wherein the coil assembly comprises a single coil comprising a wire and having a circular hole formed in the single coil, and a plurality of ferrites combined with the single coil,
    wherein an outer diameter of the single coil is about 185 mm or more and 195 mm or less, and
    wherein an inner diameter of the single coil is about 75 mm or more and 85 mm or less.

8. The wireless power transmitter of claim 7, wherein:
    each of the plurality of ferrites comprises a first protrusion and a second protrusion protruded in an identical direction, and
    the single coil is inserted between the first and second protrusions of the plurality of ferrites and combined with the plurality of ferrites.

9. The wireless power transmitter of claim 7, wherein the single coil is formed by winding the wire by a predetermined number of turns.

10. The wireless power transmitter of claim 9, wherein the predetermined number of turns is in a range of about 32 times or more and 33 times or less.

11. The wireless power transmitter of claim 7, wherein the single coil is formed by stacking two layers of the wire, and a thickness of the single coil is a total of about 3.3 mm or more and 3.6 mm or less.

12. The wireless power transmitter of claim 7, wherein an inductance of the coil assembly is about 246 uH or more and 266 uH or less.

13. The wireless power transmitter of claim 7, wherein an initial permeability of the plurality of ferrites exceeds about 2500.

14. A coil assembly for a wireless power receiver, the coil assembly comprising:
- a single coil comprising a wire and having a circular hole formed in the single coil; and
- a plurality of ferrites combined with the single coil,
- wherein an outer diameter of the single coil is about 165 mm or more and 175 mm or less, and an inner diameter of the single coil is about 70 mm or more and 80 mm or less,
- wherein each of the plurality of ferrites comprises a first protrusion and a second protrusion protruded in an identical direction, and
- wherein the single coil is inserted between the first and second protrusions of the plurality of ferrites and combined with the plurality of ferrites.

* * * * *